(12) United States Patent  (10) Patent No.: US 6,691,239 B1
Rose  (45) Date of Patent: Feb. 10, 2004

(54) VOLTAGE SEQUENCING CIRCUIT

(75) Inventor: Bruce W. Rose, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 09/711,781

(22) Filed: Nov. 13, 2000

(51) Int. Cl.$^7$ .............................................. G06F 1/26
(52) U.S. Cl. ...................................................... 713/330
(58) Field of Search ................................ 713/300, 330

(56) References Cited

U.S. PATENT DOCUMENTS

| | | | |
|---|---|---|---|
| 4,593,349 A | * | 6/1986 | Chase et al. ................ 713/330 |
| 4,674,031 A | * | 6/1987 | Siska, Jr. ..................... 700/79 |
| 5,560,022 A | * | 9/1996 | Dunstan et al. ............. 713/300 |
| 6,212,645 B1 | * | 4/2001 | Tjandrasuwita ............. 713/330 |
| 6,237,103 B1 | * | 5/2001 | Lam et al. ................... 713/330 |

* cited by examiner

*Primary Examiner*—Thomas M. Heckler
(74) *Attorney, Agent, or Firm*—Schwegman, Lundberg, Woessner & Kluth, P.A.

(57) ABSTRACT

A voltage sequencing circuit for applying a plurality of voltages to an electrical system in a predetermined sequence charges the input capacitance of a pass device to set the timing between successive power applications in the system. In one embodiment, a current source coupled to the gate terminal of a field effect transistor (FET) pass device is enabled when a previous voltage in the predetermined voltage sequence has achieved a desired level. The output current of the current source then begins to charge the gate terminal of the FET. When the gate voltage achieves a predetermined reference level, a drive unit applies a voltage to the gate terminal that exceeds a threshold voltage of the FET. The FET then causes the next voltage in the predetermined voltage sequence to be applied.

23 Claims, 3 Drawing Sheets

VOLTAGE SEQUENCING CIRCUIT

FIELD OF THE INVENTION

The invention relates generally to control circuits and, more particularly, to control circuits for use in providing power to an electrical system.

BACKGROUND OF THE INVENTION

There are many electrical systems that require power to be applied to various subsystems and/or components within the system in a specific time sequence during system power up. For example, many computer systems apply supply voltages to different subsystems on the computer motherboard in a predetermined time sequence when the computer system is turned on. In many cases, the delay period between the application of two successive voltages in such a system is critical to the proper operation of the system. For this reason, voltage sequencing circuits have been developed to appropriately and reliably sequence the application of voltages in such systems. These voltage sequencing circuits are typically implemented on a voltage controller chip housed within an integrated circuit (IC) package. The IC package is mounted on a circuit board within the electrical system where it is coupled to one or more power supplies. When the electrical system is activated, the voltage controller chip causes appropriate voltages to be applied to the various subsystems and components within the electrical system in a predetermined sequence.

Some voltage sequencing circuit designs of the past have been relatively complex. For example, in one prior voltage sequencing circuit, an oscillator and a digital counter are used to provide proper timing within the circuit. After a first voltage is applied in the system, the digital counter begins to count the number of signal cycles being generated by the oscillator. When the count value reaches a predetermined number, the voltage sequencing circuit causes the next voltage in the sequence to be applied. If there are further voltages in the sequence, an additional oscillator and counter is needed for each voltage. As can be appreciated, voltage sequencing circuits of this type are complex, require a significant amount of die area to implement, and are typically expensive. As is well known, it is generally desirable to minimize component costs within a system, particularly in systems that will be manufactured in large quantities. It is also generally desirable to minimize the size of the individual components within a system.

In another previous design, a voltage sequencing circuit is implemented within an IC package having a dedicated output pin for connection to an external capacitor. After a first voltage is applied in the system, a current source within the voltage sequencing circuit begins to charge the external capacitor. After the voltage on the external capacitor reaches a predetermined value, a drive unit within the voltage sequencing circuit signals an external switch, via another pin of the IC package, to apply the next voltage in the sequence. Thus, the second voltage is applied a predetermined time period after the first voltage, with the predetermined time period being related to the charging time constant of the external capacitor. If there are further voltages in the voltage sequence, an additional output pin and external capacitor is needed for each voltage. As is well known, because IC packages are typically pin constrained, it is generally desirable that the number of terminals that are communicating with an exterior environment to perform a particular function be minimized. In addition, by minimizing the number of pins used by an IC, a smaller package can often be used which will take up less space on the surface of a circuit board. It is also generally desirable that the number of external components that need to coupled to an IC to enable the internal circuitry to operate be minimized.

DETAILED DESCRIPTION

Figure 1:
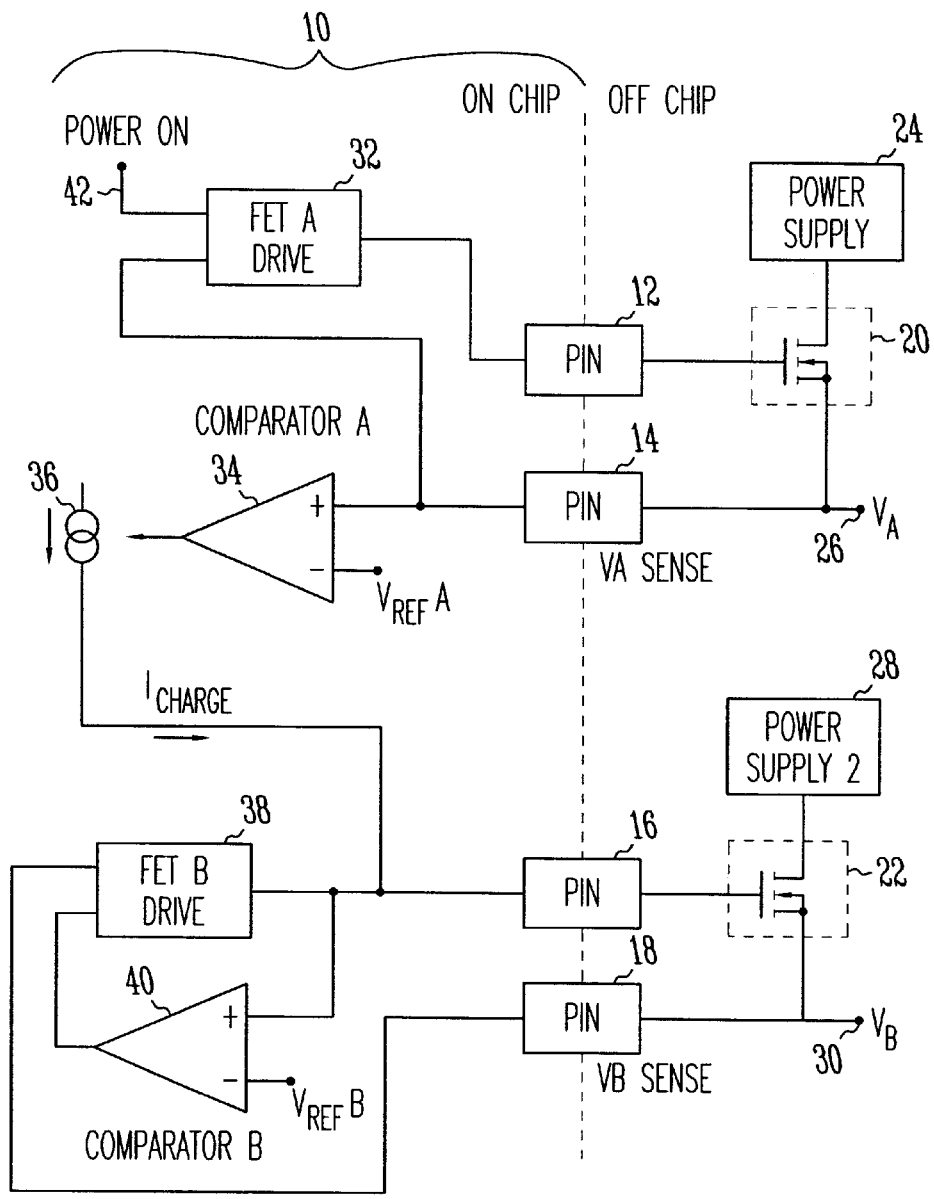
FIG. 1 is a schematic diagram illustrating a voltage sequencing circuit in accordance with one embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to a voltage sequencing circuit that is capable of applying voltages in an electrical system in a predetermined sequence. During operation, the voltage sequencing circuit is coupled to a plurality of pass devices that are used to controllably couple one or more voltage sources to a plurality of voltage terminals within the system. During a system power up operation, the voltage sequencing circuit activates the pass devices in a sequential manner to apply voltages in the system according to the predetermined sequence. To achieve proper timing between successive power applications in the system, the voltage sequencing circuit uses the input capacitance of one or more of the pass devices as a charging element having a predetermined time constant. After a previous voltage in the voltage sequence has been applied in the system, the voltage sequencing circuit begins to charge the input capacitance of the next pass device in the system. When the voltage on the input terminal of the pass device reaches a predetermined value, the pass device is turned "on" thus applying the next voltage in the sequence. By using a capacitance associated with a pass device as a timing element, an additional pin is not required in the IC package for connection to an external capacitor. In addition, because an external capacitor is not needed, the costs associated with the purchase and installation of the external capacitor are avoided. The voltage sequencing circuit can be used in any system requiring multiple voltages to be applied in a predetermined time sequence such as, for example, computer motherboards and handheld communicator units.

FIG. 1 is a schematic diagram illustrating a voltage sequencing circuit 10 in accordance with one embodiment of the present invention. The voltage sequencing circuit 10 is capable of applying voltages in a sequential manner within an electrical system. In the illustrated embodiment, the voltage sequencing circuit 10 is capable of applying two voltages in sequence. It should be appreciated, however, that any number of voltages can be applied in sequence using the inventive principles. As illustrated, the voltage sequencing circuit 10 of FIG. 1 is implemented on a semiconductor chip as either a monolithic or hybrid integrated circuit. The semiconductor chip is housed within an integrated circuit (IC) package having a number of pins 12, 14, 16, 18 to provide communication between the circuit 10 and an exterior environment.

When installed within an electrical system, the voltage sequencing circuit 10 is coupled to first and second external pass devices 20, 22 to control the application of power to different portions of the system. The first pass device 20 is operative for coupling a first power supply 24 (POWER SUPPLY 1) to a first voltage terminal 26 (Va) within the system when an appropriate control signal is received by the first pass device 20 from the voltage sequencing circuit 10. Similarly, the second pass device 22 is operative for coupling a second power supply 28 (POWER SUPPLY 2) to a second voltage terminal 30 (Vb) within the system when an appropriate control signal is received by the second pass device 22 from the voltage sequencing circuit 10. The first and second voltage terminals 26, 30 are each operative for providing a corresponding voltage level to one or more components or subsystems within the electrical system. For example, the first voltage terminal 26 might be coupled to components within the system that require an operating voltage of 5 volts and the second voltage terminal 30 might be coupled to components within the system that require an operating voltage of 3.5 volts. In addition, the 3.5 volt components may need to be powered up at least 2 microseconds after the 5 volt components to ensure proper system operation. The voltage sequencing circuit 10 will thus cause a voltage of 3.5 volts to be applied to the second voltage terminal 30 two microseconds or more after a voltage of 5 volts is applied to the first voltage terminal 26. The first voltage terminal 26 is coupled to pin 14 of the IC package and the second voltage terminal 30 is coupled to pin 18 of the IC package to allow the voltage sequencing circuit 10 to internally monitor the voltage condition on the two terminals 26, 30.

Although the first and second power supplies 24, 28 are separate units in the illustrated embodiment, it should be appreciated that a single power supply can also be used. For example, if the first and second voltage terminals 26, 30 require the same voltage level, a single power supply having a single output voltage can be used. If the first and second voltage terminals 26, 30 require different voltage levels, a single power supply having multiple output voltages or separate power supplies can be used.

In the illustrated embodiment, the first and second pass devices 20, 22 are each implemented using an insulated gate field effect transistor (IGFET) having a gate terminal and two source/drain terminals. One source/drain terminal of each pass device 20, 22 is coupled to a corresponding power supply 24, 28 and the other source/drain terminal is coupled to a corresponding voltage terminal 26, 30. The gate terminal of the first pass device 20 (i.e., the input terminal) is coupled to pin 12 of the IC package housing the voltage sequencing circuit 10. Likewise, the gate terminal of the second pass device 22 (i.e., the input terminal) is coupled to pin 16 of the IC package. When an appropriate voltage is applied to the gate terminal of one of the pass devices 20, 22, a low resistance path (e.g., a short circuit) is created between the corresponding power supply 24, 28 and voltage terminal 26, 30. The voltage that is applied to the gate terminal of the pass device will typically have to exceed a threshold voltage ($V_T$) of the IGFET to create the low resistance path (i.e., to turn the FET on). For an N channel IGFET, the gate voltage typically needs to be more positive than a positive threshold voltage to turn the device on. For a P channel IGFET, the gate voltage typically needs to be more negative than a negative threshold voltage to turn the device on. As is well known, an IGFET normally has a relatively large parasitic capacitance associated with its gate terminal.

As illustrated in FIG. 1, the voltage sequencing circuit 10 includes: a first drive unit 32 (FET A DRIVE), a first comparator 34 (COMPARATOR A), a current source 36, a second drive unit 38 (FET B DRIVE), and a second comparator 40 (COMPARATOR B). The first drive unit 32 includes an input 42 for receiving a "power on" indication when the electrical system is to be powered up. The power on indication can be derived from, for example, an ON/OFF switch within the electrical system. In response to the "power on" indication, the first drive unit 32 applies a voltage to the gate terminal of the first pass device 20, via output pin 12, that exceeds the threshold voltage of the pass device 20. This turns the first pass device 20 on, thus coupling the first power supply 24 to the first voltage terminal 26. The first power supply 24 then charges up the first voltage terminal 26 to the appropriate voltage level. In the illustrated embodiment, the non-inverting input terminal of the first comparator 34 monitors the first voltage terminal 26 via pin 14. The first comparator 34 compares the voltage on the first voltage terminal 26 to a first reference voltage (VrefA) coupled to the inverting terminal thereof. The magnitude of the first reference voltage is preferably a constant value that is the same as or slightly lower than the operating voltage level associated with the first voltage terminal 26. When the voltage on the first voltage terminal 26 reaches or passes the first reference voltage level, the comparator 34 generates an output indication that enables the current source 36. Once enabled, the current source 36 begins to generate an output current.

As illustrated in FIG. 1, the output node of the current source 36 is coupled to the gate terminal of the second pass device 22, via pin 16. Thus, when the current source 36 is enabled, the resulting output current begins to charge the parasitic gate capacitance of the second pass device 22. The output current of the enabled current source 36 preferably has a constant magnitude, although variable magnitude currents are also possible. As the parasitic gate capacitance charges, the voltage on the gate terminal of the second pass device 22 increases. The rate at which this voltage increases depends upon both the magnitude of the output current of the current source 36 and the size of the parasitic gate capacitance. The non-inverting terminal of the second comparator 40 monitors the gate voltage of the second pass device 22. When the magnitude of the gate voltage of the second pass device 22 reaches or passes that of a second reference voltage (Vref B) that is coupled to the inverting terminal of the second comparator 40, the second comparator 40 enables the second drive unit 38. In response, the second drive unit 38 applies a voltage to the gate terminal of the second pass device 22 that exceeds the threshold voltage thereof, thus coupling the second power supply 28 to the second voltage terminal 30. The second power supply 28 then charges up the second voltage terminal 28 to the appropriate voltage level. Thus, the second voltage terminal 30 reaches an operational voltage level a fixed period of time after the first voltage terminal 26, where the fixed period of time is related to the charging time of the parasitic capacitance of the second pass device 22. Thus, a fixed delay between successive voltage applications is achieved without the need for an additional output pin on the IC package or an additional external capacitor.

Figure 2:
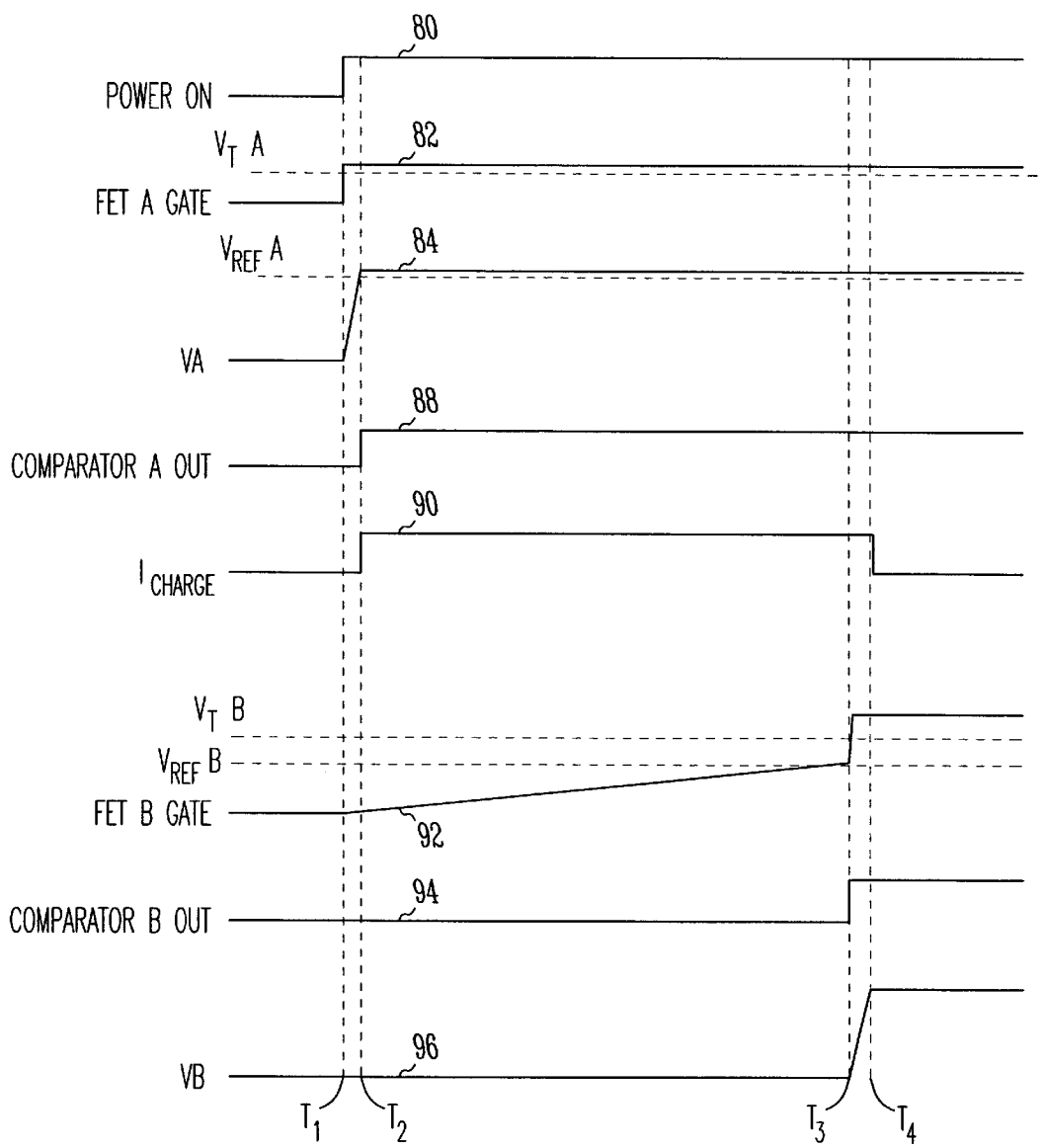
FIG. 2 is a timing diagram illustrating the operation of the voltage sequencing circuit of FIG. 1 in accordance with one embodiment of the present invention.

FIG. 2 is a timing diagram illustrating a number of waveforms that demonstrate the operation of the voltage sequencing circuit 10 of FIG. 1 in one embodiment of the present invention. It should be appreciated that, in practice, there will often be finite delays between related waveforms in the circuitry due to, for example, finite processing times in the circuitry. For ease of illustration and to facilitate understanding, these delays are not illustrated in FIG. 2. The POWER ON waveform 80 represents the signal that is received at input 42 of the first drive unit 32 of FIG. 1. The FET A GATE waveform 82 represents the voltage on the gate terminal of the first pass device 20. The VA waveform 84 represents the voltage on the first voltage terminal 26. The COMPARATOR A OUT waveform 88 represents the output voltage of the first comparator 34. The $I_{CHARGE}$ waveform 90 represents the output current of the current source 36. The FET B GATE waveform 92 represents the voltage on the gate terminal of the second pass device 22. The COMPARATOR B OUT waveform 94 represents the output voltage of the second comparator 40. Lastly, the VB waveform 96 represents the voltage on the second voltage terminal 30. With reference to FIG. 2, at time T1, the POWER ON signal 80 transitions from a logic low value to a logic high value indicating that a power up sequence is to be performed within the electrical system. As shown in the FET A GATE waveform 82, in response to the POWER ON indication, the first drive unit 32 applies a voltage to the gate of the first pass device 20 that exceeds the threshold voltage ($V_T$ A) of the first pass device 20. This turns the first pass device 20 on. As shown in the VA waveform 84, after the first pass device 20 has been turned on, the first power supply 24 begins to charge the first voltage terminal 26 to a corresponding voltage value. As illustrated, there will typically be a finite charge time associated with the first voltage terminal 26 that is dependent upon, among other things, a capacitance associated with the terminal. At time T2, the voltage on the first voltage terminal 26 (i.e., the VA waveform 84) reaches a first reference voltage value $V_{REF}$ A. As shown in the COMPARATOR A OUT waveform 88, this causes the output voltage of the first comparator 34 to transition from a logic low value to a logic high value, thus enabling the current source 36. In response, the current source 36 begins to generate a relatively constant magnitude output current, as shown in the $I_{CHARGE}$ waveform 90.

Referring to the FET B GATE waveform 92 of FIG. 2, the output current of the current source 36 begins to charge the parasitic gate capacitance of the second pass device 22 at time T2. This causes the voltage on the gate terminal of the second pass device 22 to slowly rise. At time T3, the gate voltage of the second pass device 22 reaches a second reference voltage value $V_{REF}$ B that is less than the threshold voltage ($V_T$ B) of the second pass device 22. When this occurs, the output of the second comparator 40 transitions from a logic low value to a logic high value, as shown in the COMPARATOR B OUT waveform 94 of FIG. 2. This enables the second drive unit 38 which applies a voltage to the gate terminal of the second pass device 22. As shown in the FET B GATE waveform 92, the voltage applied by the second drive unit 38 causes a sharp increase in the gate voltage of the second pass device 22 (at or slightly after time T3) that almost immediately passes the threshold voltage ($V_T$ B) of the second pass device 22. This turns the second pass device 22 on. As shown in the VB waveform 96, the second power supply 28 then charges the second voltage terminal 30 to the corresponding voltage level. The second voltage terminal 30 reaches a full operational voltage value at time T4.

As illustrated in FIG. 2, the second voltage terminal 30 reaches a full operational voltage level a fixed delay period (i.e., T4–T2) after the first voltage terminal 26. The length of the delay period depends upon the speed with which the input capacitance of the second pass device 22 (i.e., the parasitic gate capacitance of the IGFET in the illustrated embodiment) charges when being driven by the current source 36. The output current of the current source 36 will be selected to achieve a desired delay period between the voltage applications. As can be appreciated, depending on the input capacitance of the second pass device, the magnitude of the output current of the current source 36 may need to be relatively low to achieve a sustained charging period. In one embodiment, for example, the current source 36 generates an output current of 1.5 microAmps ($\mu$A) to charge a parasitic gate capacitance of 1500 picoFarads (pF). Functionality can also be included on the voltage controller chip for adjusting the magnitude of the output current of the current source 36 to tune or modify the delay between voltage applications.

With reference to the $I_{CHARGE}$ waveform 90 of FIG. 2, in the illustrate embodiment, the current source 36 is deactivated sometime after the second drive unit 38 has been enabled. This reduces the output current of the current source 36 to zero. Because the second pass device 22 is already on at this point, there is no need to pump additional current into the gate terminal of the pass device 22. In one approach, the output signal of the second comparator 40 is used to deactivate the current source 36. In another approach, the first comparator 34 includes functionality for deactivating the current source 36 at an appropriate time. Other deactivation techniques can also be used.

As described above, in the illustrated embodiment, the first and second pass devices 20, 22 are implemented using IGFET devices (e.g., a metal oxide semiconductor field effect transistor). It should be appreciated that other types of pass device may also be used including, for example, junction FETs, bipolar junction transistors (BJT), diode switches, and other forms of controlled resistance. The input capacitance of the pass device will typically include a parasitic capacitance of the device, although a shunt capacitor can also be coupled to the input terminal of the pass device (either on-chip or off-chip) to provide supplementary capacitance. Although the first and second pass devices 20, 22 are implemented "off-chip" in the illustrated embodiment, it should be appreciated that these devices can also be implemented on the same semiconductor chip as the voltage sequencing circuit 10.

In one embodiment, the first and second drive units 32, 38 include relatively simple logic functionality to apply a predetermined voltage level to a corresponding pass device input terminal at an appropriate time. In another embodiment, however, the drive units 32, 38 include controller functionality for performing a more complex analysis of present circuit conditions to determine an appropriate control signal for application to the corresponding pass devices 20, 22. The first and second pass devices 20, 22 can each also be driven as the pass element in a voltage regulator circuit. In this case, the first and second drive units 32, 38 will be similar to conventional voltage regulator controllers (e.g., error amplifier, possibly also including over current detection, voltage out of tolerance detection, and/or pulse width modulation control circuitry for a switching regulator) with an enable control input.

Figure 3:
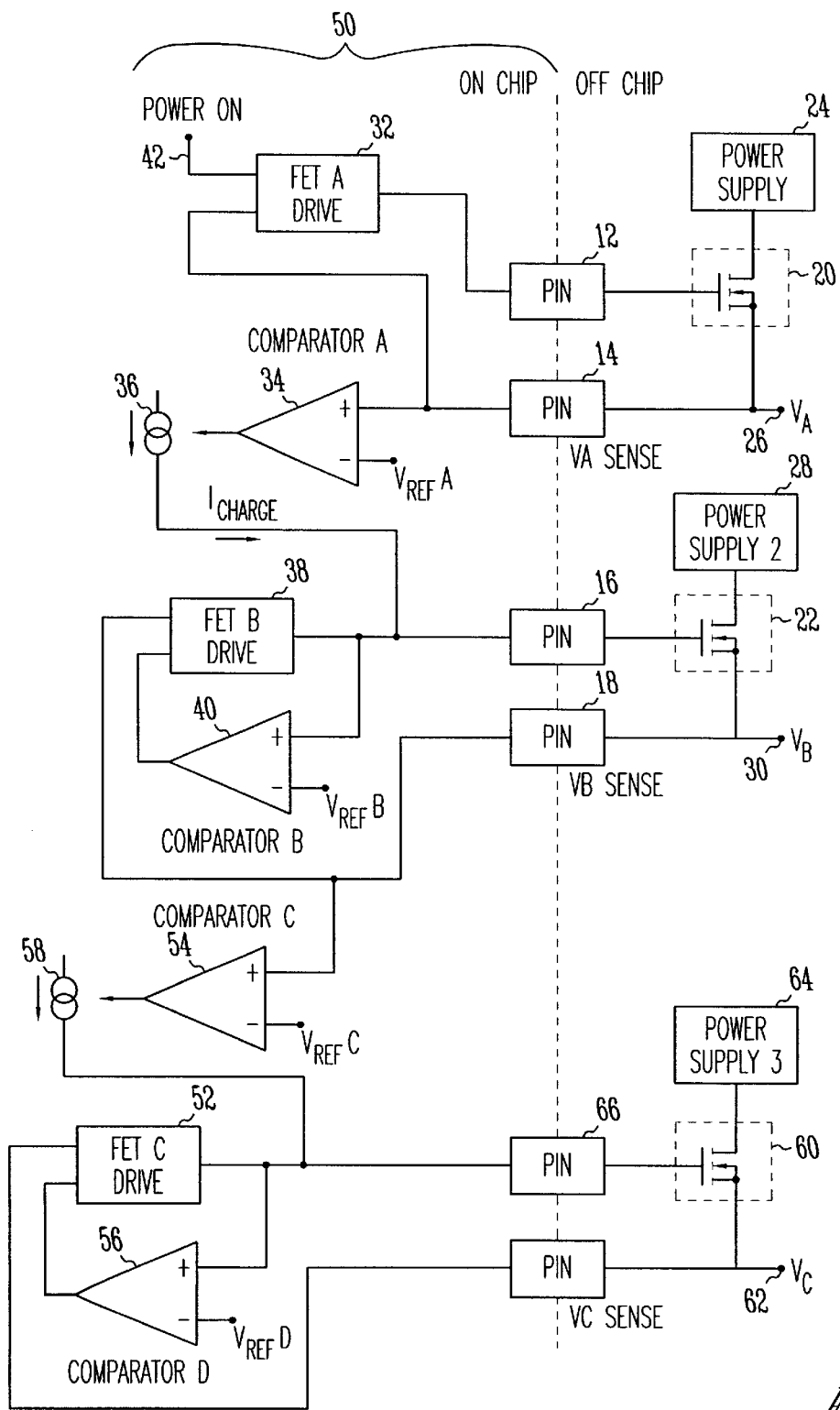
FIG. 3 is a schematic diagram illustrating a voltage sequencing circuit in accordance with another embodiment of the present invention.

As described above, the voltage sequencing circuit 10 of FIG. 1 can be modified to apply any number of voltages in a predetermined sequence. For example, FIG. 3 is a schematic diagram illustrating a voltage sequencing circuit 50 that is capable of applying three voltages in sequence. As illustrated, the voltage sequencing circuit 50 includes, in addition to the previously discussed circuitry, a third drive unit 52, third and fourth comparators 54, 56, and a second current source 58. The third comparator 54 monitors the voltage on the second voltage terminal 30 and enables the current source 58 when this voltage reaches or exceeds a third reference voltage level (VREF C). The second current source 58 then begins to charge the gate capacitance of a third pass device 60 via output pin 66. When the voltage on the gate terminal of the third pass device 60 reaches or exceeds a fourth reference voltage level ($V_{REF}$ D), the fourth comparator 56 enables the third drive unit 52 which then applies a voltage exceeding the threshold voltage of the third pass device 60 to the gate terminal of the third pass device 60. The third pass device 60 then couples a third power supply 64 to a third voltage terminal 62 within the system. The third voltage terminal 62 then charges to a corresponding voltage level. The delay between the application of the second and third voltages by the voltage sequencing circuit 50 can be the same as or different from the delay between the application of the first and second voltages. The delay values can be adjusted by varying the magnitudes of the output currents of the two current sources 36, 58.

Although the present invention has been described in conjunction with certain embodiments, it is to be understood that modifications and variations may be resorted to without departing from the spirit and scope of the invention as those skilled in the art readily understand. For example, in the embodiments described above, the voltage sequencing circuit of the present invention is implemented as an integrated circuit. It should be appreciated that discrete element sequencing circuits are also possible in accordance with the present invention. Such modifications and variations are considered to be within the purview and scope of the invention and the appended claims.

What is claimed is:

1. A voltage sequencing circuit comprising:

a first output terminal to connect said voltage sequencing circuit to an input terminal of a first pass device, said first pass device to couple a first supply voltage to a first voltage terminal of an electrical system when a voltage on said input terminal of said first pass device is within a first predetermined voltage range;

a second output terminal to connect said voltage sequencing circuit to an input terminal of a second pass device, said second pass device to couple a second supply voltage to a second voltage terminal of said electrical system when a voltage on said input terminal of said second pass device is within a second predetermined voltage range, said second pass device having an input capacitance; and a current source having an output coupled to said second output terminal to supply a charging current to said input capacitance of said second pass device to charge said input capacitance at a predetermined charging rate, said current source to generate said charging current in response to said voltage on said first voltage terminal of said electrical system achieving a first reference value.

2. The voltage sequencing circuit claimed in claim 1 wherein:

said voltage sequencing circuit causes said second pass device to couple said second supply voltage to said second voltage terminal of said electrical system a predetermined length of time after said first pass device couples said first supply voltage to said first voltage terminal of said electrical system, wherein said predetermined length of time is dependent upon said predetermined charging rate of said input capacitance of said second pass device.

3. The voltage sequencing circuit claimed in claim 2 comprising:

a delay adjustment unit to modify said predetermined length of time by controllably changing a magnitude of said charging current generated by said current source.

4. The voltage sequencing circuit claimed in claim 1 comprising:

a first drive unit to apply a voltage within said first predetermined voltage range to said input terminal of said first pass device via said first output terminal in response to a control signal.

5. The voltage sequencing circuit claimed in claim 4 comprising:

a second drive unit to apply a voltage within said second predetermined voltage range to said input terminal of said second pass device via said second output terminal when a voltage on said second output terminal achieves a second reference value, said second reference value being outside said second predetermined voltage range.

6. The voltage sequencing circuit claimed in claim 1 wherein:

said second pass device includes a field effect transistor (FET) and said input capacitance of said second pass device includes a parasitic gate capacitance of said FET.

7. The voltage sequencing circuit claimed in claim 6 wherein:

said second predetermined voltage range is defined by a threshold voltage of said FET.

8. The voltage sequencing circuit claimed in claim 1 wherein:

said voltage sequencing circuit is implemented on a single semiconductor chip housed within an integrated circuit (IC) package, said first output terminal being coupled to a first output pin of said IC package and said second output terminal being coupled to a second output pin of said IC package, said IC package to be inserted into an external circuit that includes said first and second pass devices.

9. The voltage sequencing circuit claimed in claim 1 wherein:

said current source, said first pass device, and said second pass device are implemented on a single semiconductor chip housed within an integrated circuit (IC) package.

10. The voltage sequencing circuit claimed in claim 9 wherein:

said IC package includes a first pin to be coupled to a first external power supply, a second pin to be coupled to said first voltage terminal of said electrical system, a third pin to be coupled to a second external power supply, and a fourth pin to be coupled to said second voltage terminal of said electrical system.

11. A voltage sequencing circuit comprising:
a first output terminal to connect said voltage sequencing circuit to an input terminal of a first pass device, said first pass device to couple a first supply voltage to a first voltage terminal of an electrical system when a voltage on said input terminal of said first pass device is within a first predetermined voltage range;
a second output terminal to connect said voltage sequencing circuit to an input terminal of a second pass device, said second pass device to couple a second supply voltage to a second voltage terminal of said electrical system when a voltage on said input terminal of said second pass device is within a second predetermined voltage range, said second pass device having an input capacitance;
a first drive unit to apply a voltage within said first predetermined voltage range to said input terminal of said first pass device, via said first output terminal, in response to a control signal;
a comparator to generate an enable signal when a voltage on said first voltage terminal of said electrical system achieves a first reference value; and
a current source coupled to said comparator and said second output terminal to charge said input capacitance of said second pass device in response to said enable signal.

12. The voltage sequencing circuit claimed in claim 11 comprising:
a second drive unit to apply a voltage within said second predetermined voltage range to said input terminal of said second pass device via said second output terminal when a voltage on said second output terminal achieves a second reference value, said second reference value being outside said second predetermined voltage range.

13. The voltage sequencing circuit claimed in claim 11 wherein:
said second pass device includes a field effect transistor (FET) and said input capacitance of said second pass device includes a parasitic gate capacitance of said FET, wherein said second predetermined voltage range is defined by a threshold voltage of said FET.

14. The voltage sequencing circuit claimed in claim 11 wherein:
said voltage sequencing circuit is implemented on a single semiconductor chip housed within an integrated circuit (IC) package, said first output terminal being coupled to a first output pin of said IC package and said second output terminal being coupled to a second output pin of said IC package, said IC package to be inserted into an external circuit that includes said first and second pass devices.

15. The voltage sequencing circuit claimed in claim 11 wherein:
said first drive unit, said comparator, said current source, said first pass device, and said second pass device are implemented on a single semiconductor chip housed within an integrated circuit (IC) package.

16. An electrical apparatus comprising:
a first voltage terminal to be held at a first voltage level during operation of said electrical apparatus;
a second voltage terminal to be held at a second voltage level during operation of said electrical apparatus, wherein said second voltage level needs to be applied to said second voltage terminal a predetermined period of time after said first voltage level is applied to said first voltage terminal when powering up said electrical apparatus;
a first pass device to couple a first power supply to said first voltage terminal when a voltage on an input terminal of said first pass device is within a first predetermined voltage range, said first power supply to generate said first voltage level;
a second pass device to couple a second power supply to said second voltage terminal when a voltage on an input terminal of said second pass device is within a second predetermined voltage range, said second power supply to generate said second voltage level, said second pass device having an input capacitance on said input terminal thereof; and
a voltage sequencing circuit comprising:
a first drive unit to apply a voltage within said first predetermined voltage range to said input terminal of said first pass device in response to a control signal; and
a constant current source coupled to said input terminal of said second pass device to begin charging said input capacitance of said second pass device in response to said voltage on said first voltage terminal achieving a first reference value.

17. The electrical apparatus claimed in claim 16 wherein:
said voltage sequencing circuit causes said second pass device to couple said second power supply to said second voltage terminal a predetermined length of time after said first pass device couples said first power supply to said first voltage terminal, wherein a predominant portion of said predetermined length of time is due to a charging time of said input capacitance.

18. The electrical apparatus claimed in claim 16 comprising:
a second drive unit to apply a voltage within said second predetermined voltage range to said input terminal of said second pass device when a voltage on said input terminal of said second pass device achieves a second reference value, said second reference value being outside said second predetermined voltage range.

19. The electrical apparatus claimed in claim 16 wherein said electrical apparatus includes a computer motherboard.

20. The electrical apparatus claimed in claim 16 wherein said electrical apparatus includes a handheld communicator unit.

21. A method for use in sequentially energizing voltage terminals in an electrical system, comprising:
providing a first pass device to couple a first supply voltage to a first voltage terminal when a voltage on an input terminal of said first pass device is within a first voltage range;
providing a second pass device to couple a second supply voltage to a second voltage terminal when a voltage on an input terminal of said second pass device is within a second voltage range, said second pass device having a parasitic input capacitance;
applying a voltage within said first voltage range to said input terminal of said first pass device; and
initiating charging of said parasitic capacitance of said second pass device in response to said voltage on said first voltage terminal achieving a first reference value.

22. The method claimed in claim 21, wherein:
initiating charging includes enabling a constant current source coupled to said input terminal of said second pass device when said voltage on said first voltage terminal achieves said first reference value.

23. The method claimed in claim 21, further comprising:
applying a voltage within said second voltage range to said input terminal of said second pass device when said charging voltage on said input terminal of said second pass device achieves a second reference value, said second reference value being outside said second voltage range.

* * * * *